US008814613B2

(12) United States Patent
Morvillo (10) Patent No.: US 8,814,613 B2
(45) Date of Patent: Aug. 26, 2014

(54) VENTILATION CONTROL SYSTEM (76) Inventor: Robert A. Morvillo, Dover, MA (US)

(*) Notice: Subject to any disclaimer, the term of this patent is extended or adjusted under 35 U.S.C. 154(b) by 109 days.

(21) Appl. No.: 12/753,089

(22) Filed: Apr. 1, 2010

(65) Prior Publication Data
US 2010/0304627 A1 Dec. 2, 2010

Related U.S. Application Data (60) Provisional application No. 61/165,580, filed on Apr. 1, 2009, provisional application No. 61/245,092, filed on Sep. 23, 2009.

(51) Int. Cl.
*B63H 21/22* (2006.01)
*B63H 23/00* (2006.01)
*B63H 1/18* (2006.01)

(52) U.S. Cl.
USPC .................................. 440/1; 440/66

(58) Field of Classification Search
USPC ............... 440/1, 53, 57, 61 D, 61 E, 61 G; 114/67 A, 285, 288, 289
See application file for complete search history.

(56) References Cited

U.S. PATENT DOCUMENTS

| 3,924,556 | A | | 12/1975 | Wacker |
| 4,383,829 | A | | 5/1983 | Allen, Jr. et al. |
| 4,872,857 | A | * | 10/1989 | Newman et al. .................. 440/1 |
| 5,171,175 | A | * | 12/1992 | Buzzi ............................. 440/66 |
| 5,647,780 | A | * | 7/1997 | Hosoi ............................. 440/53 |
| 5,957,078 | A | * | 9/1999 | Van Tassel ..................... 114/288 |
| 6,234,854 | B1 | * | 5/2001 | Rydzewski ..................... 440/57 |
| 6,863,013 | B2 | * | 3/2005 | Noyes, Jr. ..................... 114/285 |
| 7,540,148 | B2 | * | 6/2009 | Wild et al. ..................... 60/602 |
| 2001/0032466 | A1 | * | 10/2001 | Waszkiewicz et al. .......... 60/602 |

FOREIGN PATENT DOCUMENTS

| EP | 0 289 471 | 11/1988 |
| EP | 0 336 344 | 10/1989 |
| EP | 1 731 418 | 12/2006 |
| WO | 2006068504 | 6/2006 |
| WO | WO 2006068504 A1 * | 6/2006 |

OTHER PUBLICATIONS

International Search Report from a corresponding International Patent Application No. PCT/US2010/029723 mailed Nov. 4, 2010.
International Preliminary Report on Patentability for PCT/US2010/029723, mailed Oct. 13, 2011.

* cited by examiner

*Primary Examiner* — Lars A Olson
*Assistant Examiner* — Anthony Wiest
(74) *Attorney, Agent, or Firm* — Wolf, Greenfield & Sacks, P.C.

(57) ABSTRACT

An aeration control system and method for a marine vessel. The system includes a valve configured to be coupled to an aeration conduit of a marine vessel. The valve is configured to be responsive to a valve control signal having a first value so as to be open and to provide air to the aeration conduit, and the valve configured to be responsive to the valve control signal having a second value so as to be closed and not provide air to the aeration conduit. The aeration control system also includes a control device, electrically coupled to the valve, that provides the valve control signal to the valve.

21 Claims, 11 Drawing Sheets

FIGURE 2B
ARTICULATING DRIVE WITH
SURFACE PROPELLER
CROSS SECTIONAL VIEW
PRIOR ART

FIGURE 2A
ARTICULATING DRIVE WITH
SURFACE PROPELLER
REAR VIEW
PRIOR ART

FIGURE 3B
OUTDRIVE WITH SURFACE PROPELLER
CROSS SECTIONAL VIEW
PRIOR ART

FIGURE 3A
OUTDRIVE WITH SURFACE PROPELLER
REAR VIEW
PRIOR ART

FIGURE 4
AUTOMATIC TRIM CONTROL SYSTEM

FIGURE 6B
VALVE/ACTUATOR ASSEMBLY (602) SIDE

FIGURE 6A
VALVE/ACTUATOR ASSEMBLY (602) FRONT

CONNECTION LINK (606)

GATE VALVE (502)

ACTUATOR (604)

FIGURE 8 - ACTUATOR CUTAWAY

FIGURE 9

SYSTEM FOR OPERATOR CONTROL
OF THE AERATION VALVE

Figure 10
Turbo Boost, Percent load, Engine RPM, & HP plotted over time

VENTILATION CONTROL SYSTEM

CROSS-REFERENCE TO RELATED APPLICATIONS

This application claims priority under 35 U.S.C. §119(e) to U.S. Provisional Patent Application No. 61/165,580 filed Apr. 1, 2009, and to U.S. Provisional Patent Application No. 61/245,092 filed Sep. 23, 2009, each of which is herein incorporated by reference in its entirety.

BACKGROUND

1. Field of Invention

At least one embodiment of the invention relates to a system and method for controlling aeration and/or actuation of a surface ventilation propeller of a marine vessel.

2. Discussion of Related Art

A surface-piercing propeller (or surface propeller) is a propeller that is positioned so that when the vessel is underway the waterline passes right through the propeller's hub. This is usually accomplished by extending the propeller shaft out through the transom of the vessel, and locating the propeller some distance aft of the transom in the relatively flat water surface that flows out from the transom's bottom edge. (The exception being single-shaft catamarans, where the propeller hub intersects the undisturbed waterline.) In the case of articulated surface drive systems, the propeller shaft is driven through a double universal joint inside an oil-tight ball joint, allowing the shaft to rotate athwartships for steering and to trim up and down for control of propeller submergence. Fixed-shaft surface drives can use conventional shafts and stern tube bearings, but require rudders. In many racing applications, outboards and outdrives can be positioned sufficiently high on the vessel for the propellers to operate in a surface-piercing mode. The primary operating feature of a ventilating propeller is that each propeller blade is out of the water for approximately half of each revolution.

Traditional propeller design and selection is almost always an exercise in trading off diameter against several other performance-limiting parameters. Basic momentum theory tells us that for a given speed and thrust, the larger the propeller, the higher the efficiency. While there are exceptions, most notably the effects of frictional resistance on large, slow-turning propellers, it is generally borne out in practice that a larger propeller with a sufficiently deep gear ratio will be more efficient than a small one.

A number of design considerations conspire to limit the maximum feasible propeller diameter to something considerably smaller than the optimal size. These include blade tip clearance from the hull, maximum vessel draft, shaft angle, and engine location. While this may at times make life easy for the designer—the propeller diameter specified is simply the maximum that fits—it can also result in a considerable sacrifice of propulsive efficiency. And if these geometric limits on propeller diameter are exceeded, the result can be excessive vibration and damage due to low tip clearances, or a steep shaft angle with severe loss of efficiency and additional parasitic drag, or deep navigational draft that restricts operation or requires a protective keel and its associated drag. In many cases, the best design solution is to live with a mix of all of the above problems to some degree. The surface-piercing propeller frees the designer from these limitations. There is virtually no limit to the size of propeller that will work. The designer is able to use a much deeper reduction ratio, and a larger, lightly-loaded, and more efficient propeller.

When a submerged propeller blade cavitates, the pressure on part of the blade becomes so low that a water vapor cavity is developed. When these water vapor cavities collapse, water impacts on the blade surface with a local pressure singularity—that is, a point with theoretically infinite velocity and pressure. The effect can approximate that of hitting the blade with a hammer on each revolution. Cavitation is a major source of propeller damage, vibration, noise, and loss of performance. And although high-speed propellers are often designed to operate in a fully-cavitating (supercavitating) mode, problems associated with cavitation are frequently a limiting factor in propeller design and selection.

The surface propeller effectively eliminates cavitation by replacing it with ventilation. With each stroke, the propeller blade brings a bubble of air into what would otherwise be the water vapor cavity region. The water ram effect that occurs when a vacuum cavity collapses is suppressed, because the air entrained in the cavity compresses as the cavity shrinks in size. Although the flow over a superventilating propeller blade bears a superficial resemblance to that over a supercavitating blade, most of the vibration, surface erosion, and underwater noise are absent.

Note that cavitation can also be associated with sudden loss of thrust and high propeller slip, often caused by a sharp maneuver or resistance increase. This can still occur with surface propellers, although the propeller is ventilating rather than cavitating and the result is not as damaging.

Exposed shafts, struts, and propeller hubs all contribute to parasitic drag. There is also a considerable amount of power loss resulting from the friction of the shaft rotating in the water flow. In fact, for conventional installations a net performance increase can often be realized by enclosing submerged shafts in non-rotating shrouds, despite the increase in diameter.

Figure 2A:
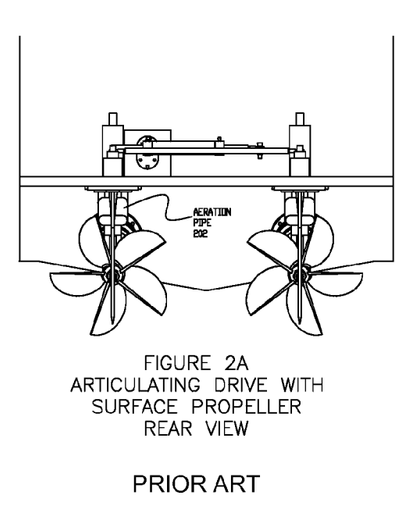
FIG. 2A illustrates a rear view of a vessel having an articulating drive system and aeration pipe.
Figure 2B:
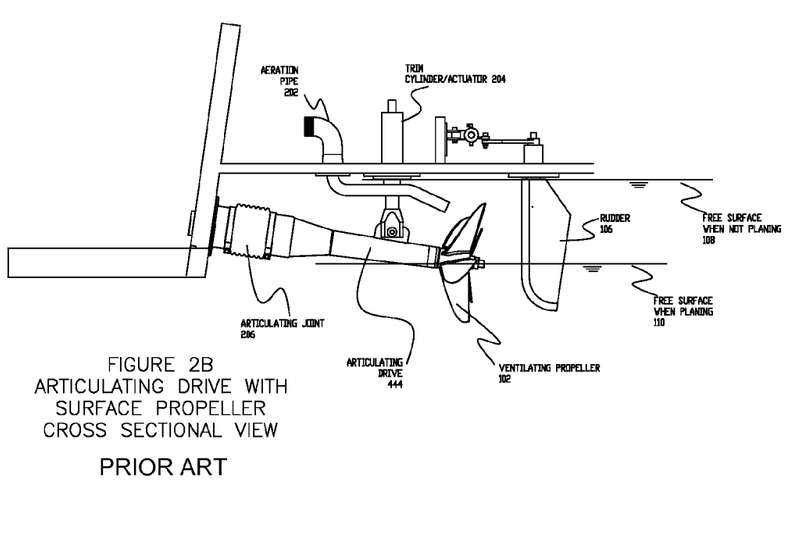
FIG. 2B illustrates a cross sectional view of the vessel with articulating drive system and aeration pipe of FIG. 2A.

Surface propellers virtually eliminate drag from all of these sources, as the only surfaces to contact the water are the propeller blades and a skeg or rudder. When a surface propeller is used in conjunction with an articulated drive system, the vessel operator then has the ability to adjust propeller submergence underway. This has roughly the same effect as varying the diameter of a fully submerged propeller, and allows for considerable tolerance in selecting propellers—or it allows one propeller to match a range of vessel operating conditions. This capability is somewhat analogous to adjusting pitch on a controllable pitch propeller. FIG. 2A-B illustrate an example of an articulating drive system that includes a ventilating propeller 102. The propeller submergence below the free surface is adjusted by actuating the trim cylinder 204 up and down. When an articulated drive is used for steering, the result can be exceptionally good high-speed maneuvering characteristics. On single-shaft applications, drive steering can also be used to compensate for propeller-induced side force, without resorting to an excessively large rudder or skeg.

Most planing hull designs, especially moderately low-powered or heavy designs, are subject to problems getting through "hump" speed. High vessel resistance at pre-planing speeds, high propeller slip, and reduced engine torque output at less than full RPM can sometimes combine to make it impossible to reach design speed, even though the vessel may be perfectly capable of operating at design speed once it gets there. The boat that "can't get out of the hole" is a phenomenon that should be quite familiar to many designers and builders. With surface propulsion systems there is an additional factor which may make the situation worse—the propeller is designed to operate with only half of the blade area immersed below the waterline (illustrated by the planning speed free surface 110 in FIGS. 1, 2A-B & 3A-B). But at low speeds, before the transom aerates or "drys out," the propeller must operate fully submerged (this condition is illustrated by the propeller below the non-planing speed free surface 108 in FIGS. 1, 2A-B & 3A-B). Not only is the submerged area doubled, but the top half is operating in very strong wake turbulence right behind the transom 112. The result is that it takes much more torque to spin the propeller at a given RPM, and sometimes the engine is not capable of providing the torque necessary to turn the propeller fast enough to get the boat up to the speed to allow the transom to aerate and unload the top half of the propeller.

Figure 1:
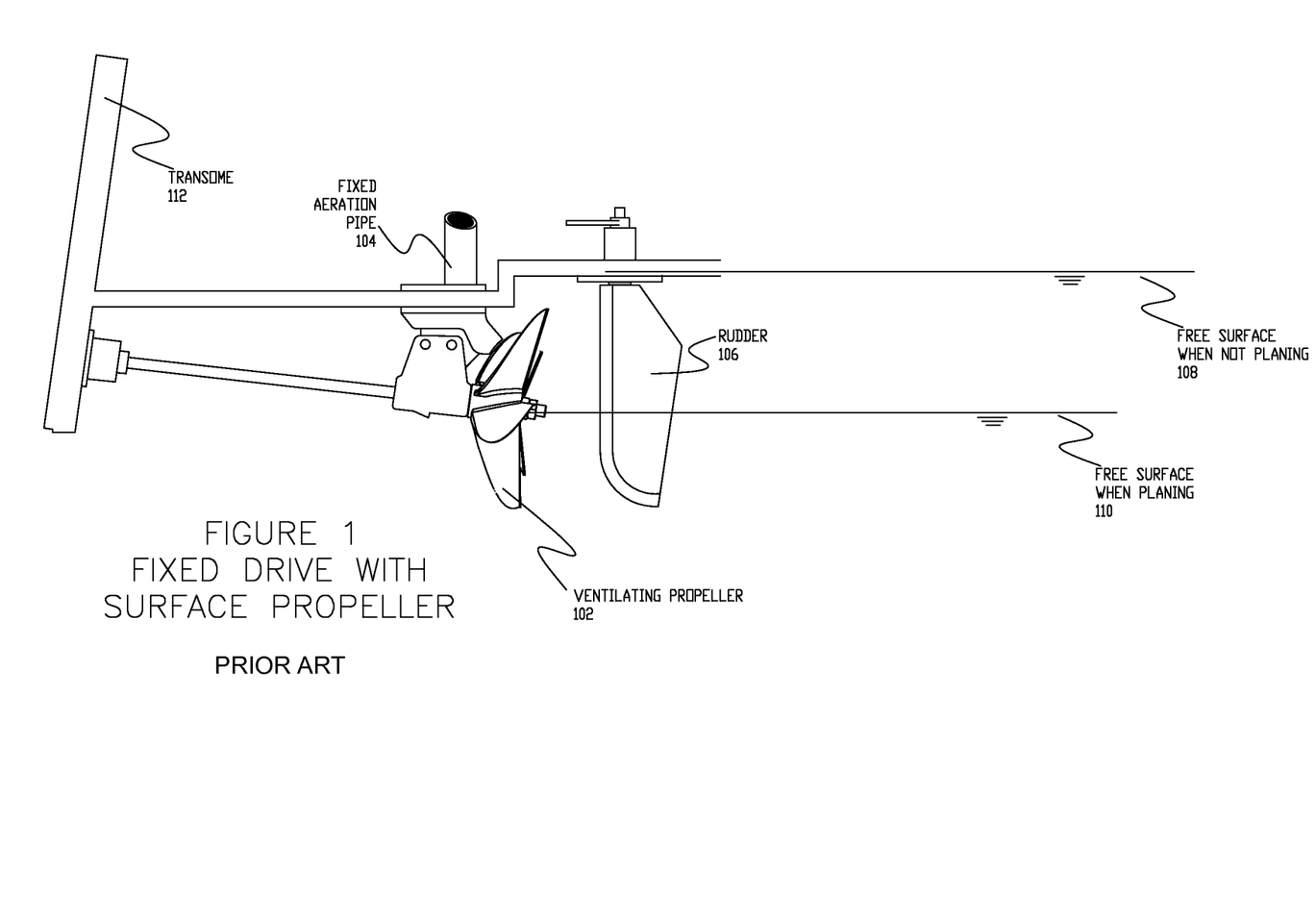
FIG. 1 illustrates a cross sectional view of the vessel having a fixed drive system and aeration pipe.
Figure 3A:
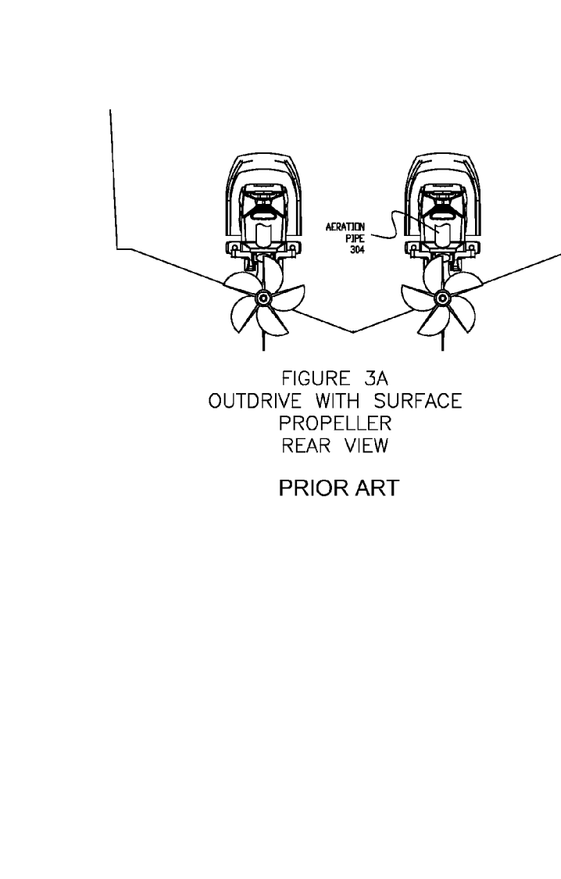
FIG. 3A illustrates a rear view of a vessel having dual out-drives configured with respective surface propellers and aeration pipes.
Figure 3B:
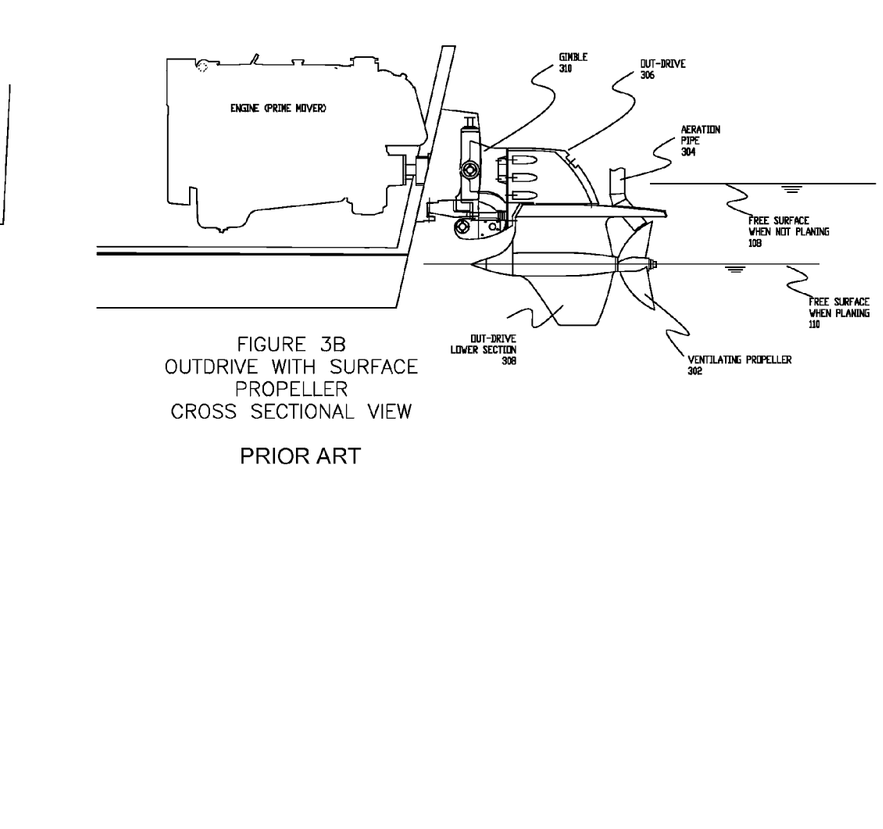
FIG. 3B illustrates a cross sectional view of the vessel with dual drives, surface propellers and aeration pipes of FIG. 3A.

To reduce this potential problem, various methods of aerating the top half of the propeller have been employed. On some installations, passive (fixed) "aeration pipes" leading from above the static waterline to the forward side of the propeller have been effective. Examples of ventilating propellers that use aeration pipes with various drives systems are shown in FIGS. 1, 2A-B & 3A-B. FIG. 1 illustrates a fixed surface drive including a ventilating propeller 102 with an aeration pipe 104. The system illustrated in FIGS. 2a-b is an articulating surface drive that articulates the ventilating propeller 102 by an articulating drive shaft 208 that is pivoted up and down via actuation of the trim cylinder 204. The aeration pipe 202 in the figure is fixed; however, it could also be fixed to the articulating drive shaft housing and move up and down with the drive. FIGS. 3a-b illustrates a surface propeller 302 that is installed on an out-drive 306. The out drive can be articulated side to side for steering and up and down to adjust the propeller submergence. An aeration pipe 304 is fixed to the lower drive section 308 in order to maintain the proximity of the pipe 304 to the ventilating propeller 302 when the lower drive section 308 is moving.

The above-described systems can be improved upon.

SUMMARY OF INVENTION

Aspects and embodiments of the invention are directed to a system and method for controlling aeration and/or actuation of a surface ventilation propeller of a marine vessel.

According to one embodiment, an aeration control system for a marine vessel is provided with a valve configured to be coupled to an aeration conduit of a marine vessel. The valve is configured to be responsive to a valve control signal having a first value so as to be open and to provide air to the aeration conduit, and the valve configured to be responsive to the valve control signal having a second value so as to be closed and not provide air to the aeration conduit. The aeration control system also includes a control device, electrically coupled to the valve, that provides the valve control signal to the valve.

According to aspects of the system, the control device can be a switch that in a first position provides the valve control signal in the first state and that in a second position provides the valve control signal in the second state.

According to aspects of the system, the control device can be a variable knob that in a first position provides the valve control signal in the first state, that in a second position provides the valve control signal in the second state, and that in a plurality of positions between the first position in the second position provides the valve control signal that corresponds to a valve position between the opened and closed positions.

According to aspects of the system, the control device can be a processor that provides the valve control signal in response to receipt of at least one second control signal. According to aspects, the processor is configured to provide the valve control signal having the first value so as to open the valve to provide air to the aeration conduit in response to the second control signal being below a threshold value, and the processor is configured to provide the valve control signal having the second value so as to close the valve and not provide air to the aeration conduit in response to the second control signal being above a threshold value.

According to aspects of the system, the control device can be a processor that provides the valve control signal in response to receipt of at least one second control signal. According to aspects, the processor is configured to provide the valve control signal having the first value so as to open the valve to provide air to the aeration conduit in response to the second control having a first state, the processor is configured to provide the valve control signal having the second value so as to close the valve and not provide air to the aeration conduit in response to the second control having a second state, and the processor is configured to provide the valve control signal having a third value so as to partially open and partially close the valve so as to provide less than full aeration of the aeration conduit in response to the second control having a third state between the first and second states.

According to aspects of the system, the valve is coupled to the aeration conduit by a hose. Alternatively, the valve is included within the aeration conduit. According to aspects of the system, the valve can be a gate valve.

According to aspects of the system, the system can include an actuator configured to be coupled to an articulating surface propeller of the marine vessel, that in response to an actuator control signal having a first value is configured to actuate the articulating surface propeller of the marine vessel to a first position and that, in response to an actuator control signal having a second value is configured to actuate the articulating surface propeller of the marine vessel to a second position, so as to vary an amount of submergence of the articulating surface propeller.

According to aspects of the system, a controller provides the actuation control signal to the actuator. According to aspects of the system, the controller is a processor that is configured to provide actuation control signal in response to receipt of at least one second control signal. According to aspects of the system, the controller comprises a switch that in a first position provides the actuator control signal in the first state and that in a second position provides the actuator control signal in the second state. According to aspects of the system, the controller comprises a variable knob that in a first position provides the actuator control signal in the first state, that in a second position provides the actuator control signal in the second state, and that in a plurality of positions between the first position in the second position provides the actuator control signal that corresponds to an actuator position between the first position and the second position.

According to aspects of the system, the system also includes a sensor configured to sense an amount of revolution per minute (RPM) of a drive for a surface propeller. According to aspects of the system, the system, the sensor is configured to be mounted directly in the turbine of the drive.

According to aspects of the system, the aeration conduit is also provided and is configured to be fluidly coupled to a surface propeller of the marine vessel.

According to aspects of the system, the surface propeller is also provided and is configured be coupled to the marine vessel to propel the vessel by surface propulsion. According to aspects of the system, the surface propeller is constructed and arranged to be coupled to the marine vessel as a fixed propeller that does not move in position with respect to a transom of the vessel. According to aspects of the system, the surface propeller is constructed and arranged to be coupled to the marine vessel as an articulated propeller in combination with an actuator, which actuates the surface propeller in response to an actuation control signal with respect to a transom of the vessel to one of a plurality of positions to vary an amount of submergence of the surface propeller.

According to aspects of the system, the system is provided with a drive system configured to be mounted to the marine vessel and to be coupled to the surface propeller, that is responsive to a first control signal corresponding to a commanded throttle of the surface propeller, that provides a least a second control signal corresponding to a load condition of the drive system, and that is configured to rotate the surface propeller.

According to one embodiment, a method of controlling aeration of a surface propeller of a marine vessel is provided. The method includes fluidly coupling a valve to an aeration conduit of a marine vessel, and electrically coupling a remote from the valve control device to the valve. The method includes providing, with the remote control device, a valve control signal to the valve having a first state so as to open the valve and to provide air to the aeration conduit for certain load conditions of a prime mover of the marine vessel, and providing, with the remote control device, the valve control signal having a second state so as to close the valve and to not provide air to the aeration conduit for other load conditions of the prime mover of the marine vessel.

According to aspects of the method, the method includes controlling the valve with a variable knob that in a first position provides the valve control signal in the first state, that in a second position provides the valve control signal in the second state, and that in a plurality of positions between the first position in the second position provides the valve control signal that corresponds to a valve position between the opened and closed positions.

According to aspects of the method, the method includes controlling the valve with the remote control device comprising a processor that provides the valve control signal in response to receipt of at least one second control signal. According to aspects, the processor provides the valve control signal having the first value so as to open the valve to provide air to the aeration conduit in response to the second control signal being below a threshold value, and provides the valve control signal having the second value so as to close the valve and not provide air to the aeration conduit in response to the second control signal being above a threshold value. According to alternative aspects, the processor provides the valve control signal having the first value so as to open the valve to provide air to the aeration conduit in response to the second control having a first state, configured to provide the valve control signal having the second value so as to close the valve and not provide air to the aeration conduit in response to the second control having a second state, and configured to provide the valve control signal having a third value so as to partially open and partially close the valve so as to provide less than full aeration of the aeration conduit in response to the second control having a third state between the first and second states.

According to aspects of the method, the method comprises coupling the valve to the aeration conduit by a hose. According to aspects of the method, the method comprises including the valve within the aeration conduit.

According to aspects of the method, the method comprises coupling an actuator to an articulating surface propeller of the marine vessel, and configuring the actuator to actuate the articulating surface propeller of the marine vessel to a first position in response to an actuator control signal having a first value and to actuate the articulating surface propeller of the marine vessel to a second position in response to an actuator control signal having a second value, so as to vary an amount of submergence of the articulating surface propeller.

According to aspects of the method, the method comprise providing a controller electrically coupled to the actuator that provides the actuation control signal to the actuator. According to aspects, the processor provides the actuation control signal in response to receipt of at least one second control signal.

According to aspects of the method, the method comprises comprising providing a sensor configured to sense an amount of revolution per minute (RPM) of a drive, and that is configured to be mounted directly the drive.

According to aspects of the method, the method comprises coupling the aeration conduit to a surface propeller of the marine vessel.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

At least some aspects and embodiments of the invention are directed to a system and method that controls and amount of aeration and/or an amount of trimming of a ventilating surface propeller of a marine vessel.

It is to be appreciated that embodiments of the methods and apparatus discussed herein are not limited in application to the details of construction and the arrangement of components set forth in the following description or illustrated in the accompanying drawings. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

As discussed above, there is a direct relationship between the submerged area and/or the amount of ventilation of a propeller and the torque for a given RPM. A propeller that is overly submerged or not sufficiently ventilated may overload the prime mover. This phenomenon is most prevalent when accelerating from zero or slow speeds in order to achieve a planing condition, sometimes referred to as getting on step or on plane. In many cases, the excessive torque on the propeller will impede the turbo charger's ability to develop boost pressure, thereby limiting the craft's ability to accelerate. While the propeller torque can be reduced by providing ventilation to the propeller 102 such as with an aeration pipe 104, 202, 304 as illustrated in FIGS. 1, 2a-b, and 3a-b) or reducing the submerged area of the propeller 102 (by trimming the drive up with the trim actuator 204), it may also result in the propeller receiving too much aeration causing excessive slip (loss of torque) in the water, leading to an overspeed condition and a dramatic reduction in thrust.

Figure 4:
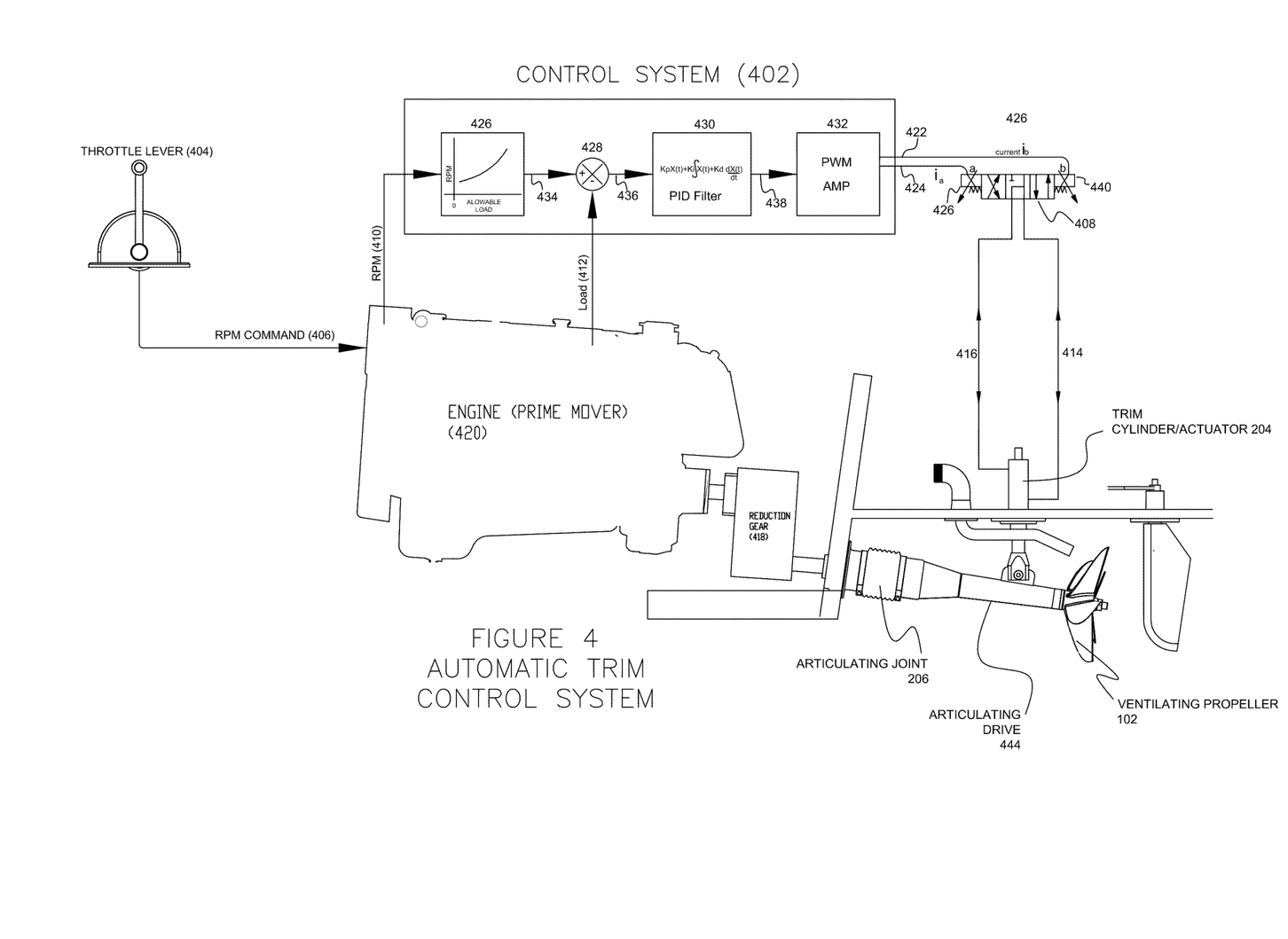
FIG. 4 illustrates one embodiment of an automatic trim control system for a vessel, which by way of example is illustrated with a control system for controlling a surface propeller with an articulating drive system and aeration pipe.

According to aspects of the system disclosed herein, it would be beneficial to actively control the amount of submergence of a propeller 102 to optimize the torque of a propeller 102 based on monitoring engine parameters such as torque and RPM. FIG. 4 illustrates an embodiment of an automatic trim control system that includes a controller 402 that receives and processes an engine RPM signal 410 and a load signal 412, so as to determine the loading conditions of the engine. The controller 402 is configured with the allowable load function 426 that calculates the allowable load signal 434 based on the engine RPM signal 410. The allowable load signal 434 is then compared to the actual load signal 412 using summing junction 428. The output signal 436 of the summing junction 428 (also referred to as the error signal) is then processed by the PID filter 430 according to the illustrated filter function, where Kp, Ki and Kd gains are applied to the signal 436. The output signal 438 of the PID filter is then processed by the pulse width modulation (PWM) amplifier module 432, which provides the current output signals Ib 422 and Ia 424 that drive the electro-hydraulic proportional valve 408. When current flows to the b coil 440, the hydraulic valve 408 actuates such that hydraulic oil flows out of the b line 414 (and back through the a line 416) and forces the trim cylinder 204 to lift the articulating drive 444, thereby reducing the amount of propeller 102 in the water and unloading the engine 420. When current flows into the a coil 442, the hydraulic valve 408 actuates such that hydraulic oil flows out of the a line 416 (and back through the b line 414) such that the trim cylinder 204 pushes the articulating drive 444 down, thereby increasing the amount of propeller 102 in the water and increasing the load on the engine 420. As the propeller 102 is raised and lowered by the trim cylinder 204, the engine load decreases and increases respectively and the load signal 412 feeds the real time load information back to the control system 402 such that that current outputs 422, 424 can be modulated in order to maintain the actual load signal 412 as close as possible to the allowable load signal 434. Although not shown in the drawing for clarity reasons, it is also possible to bypass (manually override) the control system 402 and manually control the hydraulic valve 408 with a direct set of controls. It should be appreciated that such a system can maintain an optimum load on the propeller, thereby maximizing the propeller thrust that is available while at the same time protecting the engine against overloading.

It should also be appreciated that the system illustrated in FIG. 4 is one example of an automatic trim control system. One skilled in the art can rearrange and/or replace various components to achieve the basic functionality of actively controlling the submergence of a ventilating propeller 102 based on the engine RPM signal 410 and the engine load signal 412. If an engine is equipped with a data bus such as SAE J1939, it is would be possible to connect the control system directly to the engine's data bus and obtain the equivalent signals 410 and 412 from the data bus.

Figure 5A:
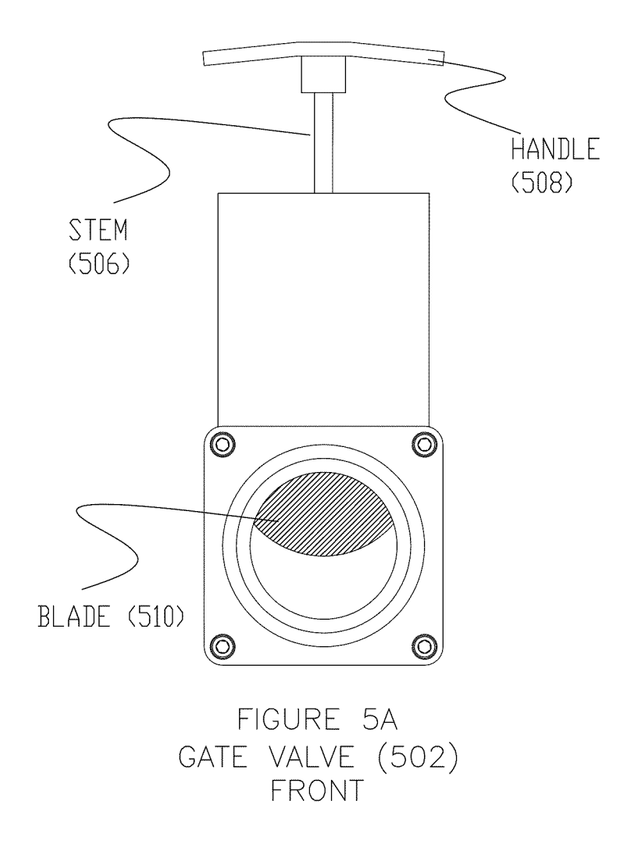
FIGS. 5A-B illustrate, respectively, a front view and a side view of one embodiment of a valve that can be used to regulate the amount of air provided through the aeration pipe of various embodiments of the system disclose herein.
Figure 5B:
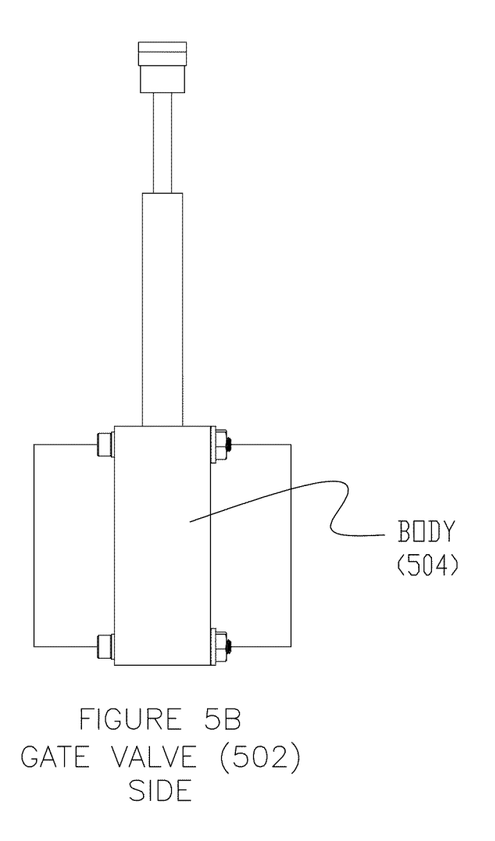

Additionally, it would be beneficial to actively control the propeller ventilation that is provided by an "aeration pipe" such as aeration pipes 104, 202 & 304 illustrated in FIGS. 1, 2a-2b, and 3a-3b. According to an aspect of the invention, the amount of aeration provided to a propeller 102 can be actively or remotely controlled by using a valve or other modulating/metering device (such as a pump, compressor or fan) in order to optimize certain parameters of such systems in real time. FIG. 5A-B illustrate one embodiment of a valve 502, known as a gate valve, that can be used to regulate the amount of air provided through the aeration pipes 104, 202 & 304 for the systems illustrated in FIGS. 1, 2a-2b, and 3a-3b. The gate valve comprises a body 504 for the air to flow through, a blade 510 that slides up and down in order to modulate a size of the orifice, and a stem 506 & handle 508 assembly that is used to actuate the blade 510. Moving the handle/stem up and down modulates the flow of air through the valve. It is to be appreciated that the gate valve 502 shown in FIGS. 5A-B is just one example of a valve or other modulating device that can be used to restrict or meter the air through the aeration pipes 104, 202 & 304. One skilled in the art could apply any number of valve types or devices to accomplish the same task such as ball valves, butterfly valves, needle valves, globe valves spool valves poppet valves and any other conceivable means of controlling or modulating a variable orifice.

Figure 6A:
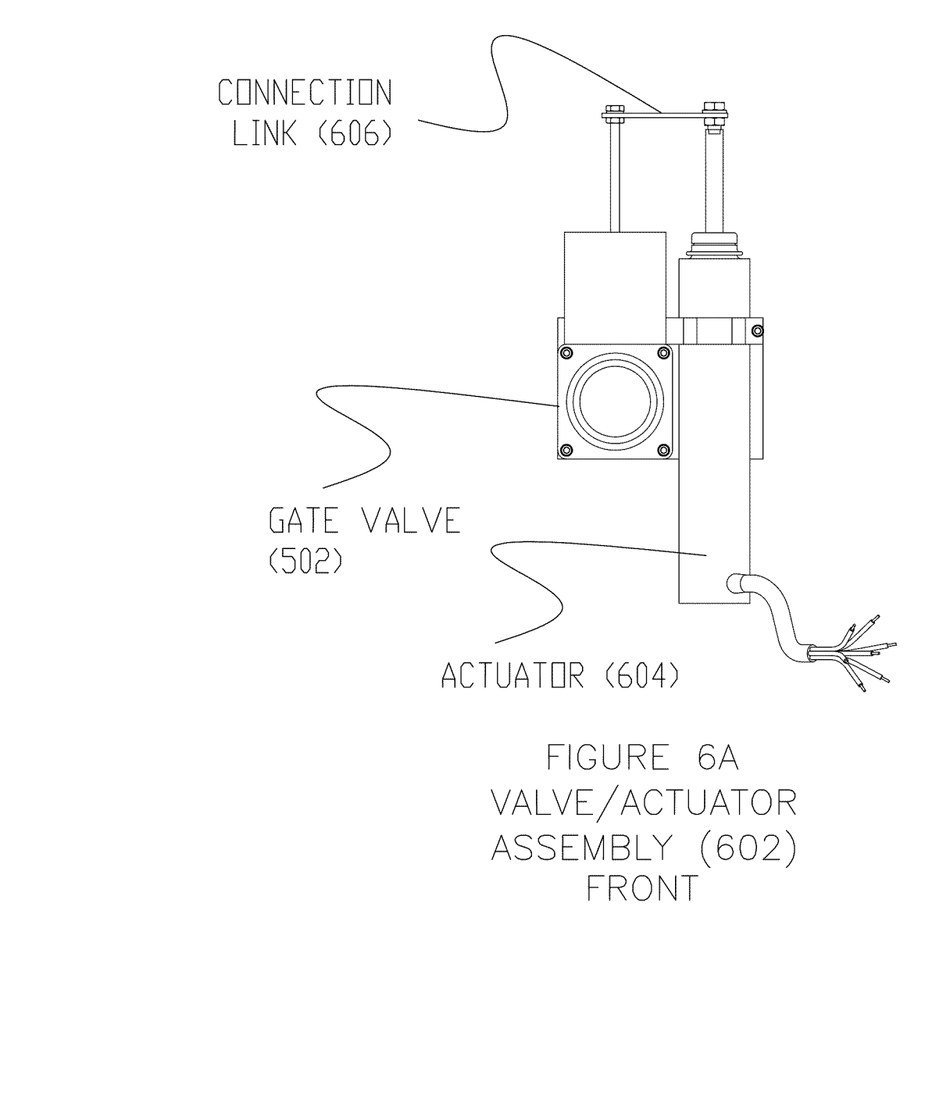
FIGS. 6A-B illustrate, respectively, a front view and a side view of an actuator/valve assembly that can be used to regulate the amount of air provided through the aeration pipe of various embodiments of the system disclose herein.
Figure 6B:
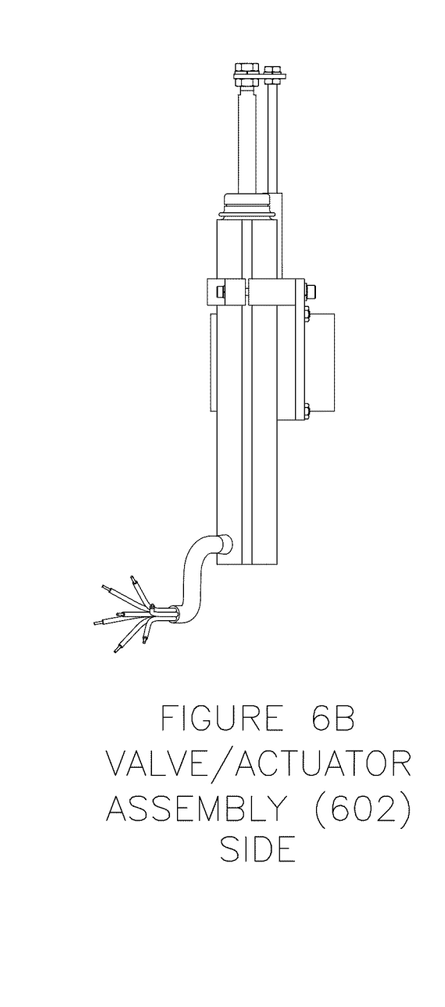
Figure 7A:
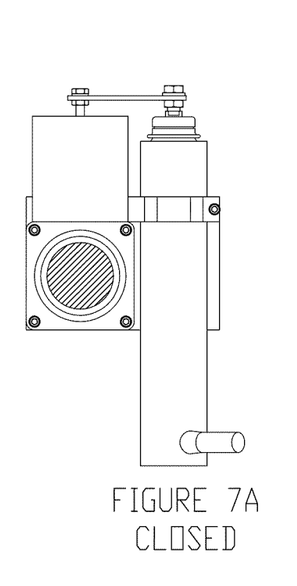
FIGS. 7A-C illustrate the actuator/valve assembly of FIG. 6A-B actuated at three exemplary positions, closed, partially open, and open, respectively.
Figure 7B:
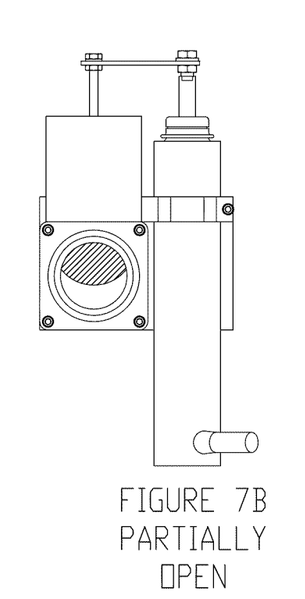
Figure 7C:
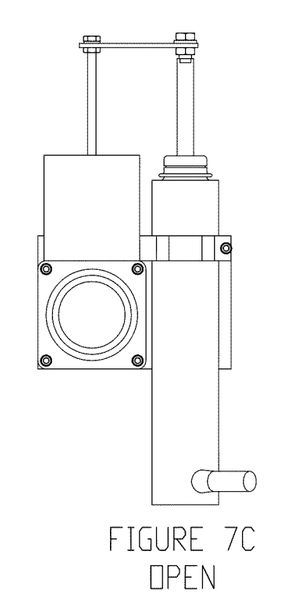

In order to actuate the valve from a remote location such as the driver or throttle man's position or through the use of a controller or processor, an actuator 604 can be coupled to the moving components of the valve 502 (such as the stem 506 of the gate valve). FIGS. 6A-B illustrates an actuated gate valve assembly 602 including a valve 502 and actuator 604 configured so that the output shaft of a linear actuator 604 is coupled to the stem 506 of the gate valve 502 through a connecting link 606. According to this embodiment, a position of the gate valve blade 510 is actuated by controlling the position of the actuator rod 812. By way of example, FIGS. 7A-C illustrate the actuator/valve assembly 602 actuated at three exemplary positions, open, partially open and closed.

Figure 8:
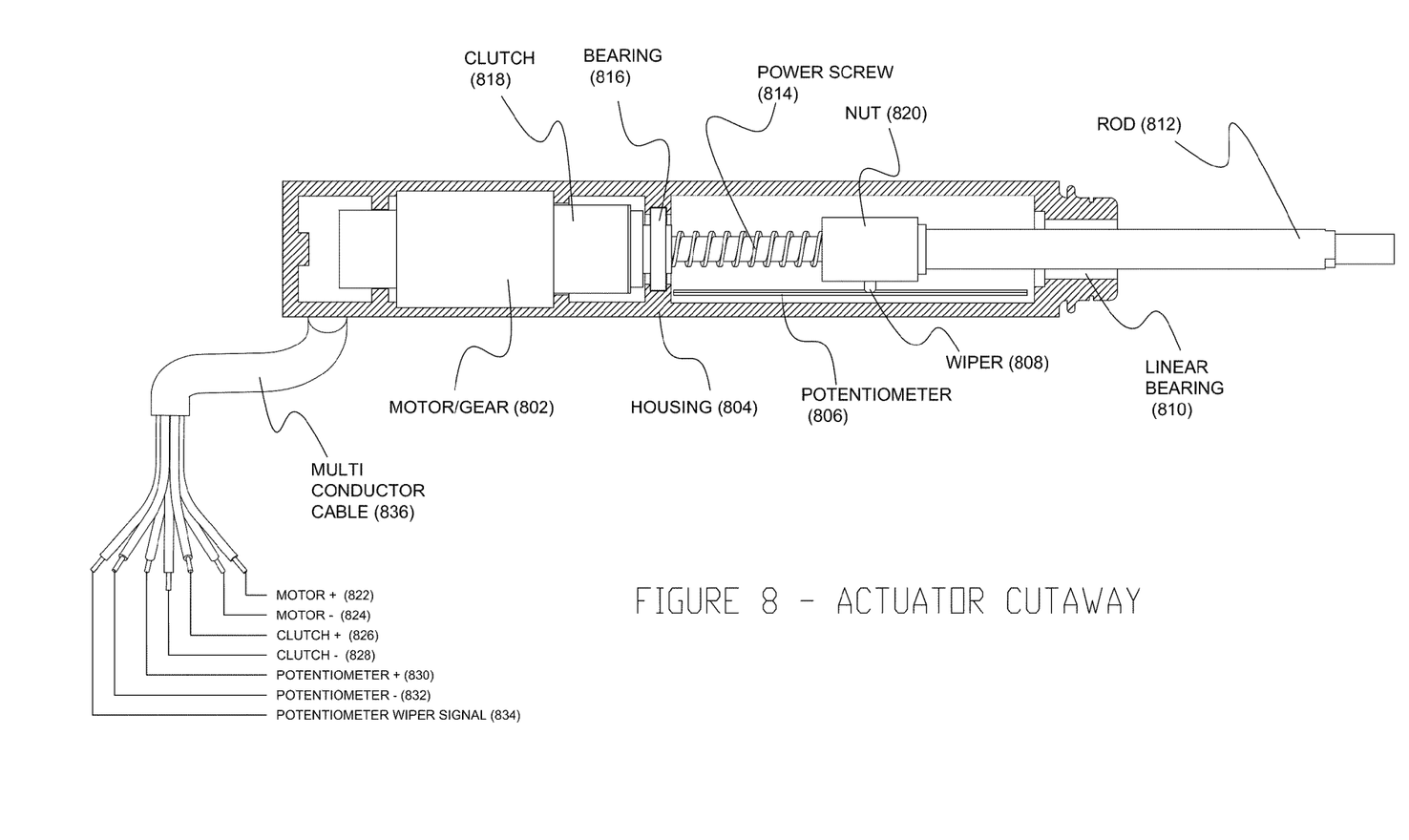
FIG. 8 illustrates one embodiment of an actuator that can be used in various embodiments of the system and controller described herein.

One embodiment of an actuator that can be used in the various embodiments of the system and controller described herein is illustrated by a cutaway view in FIG. 8. The actuator comprises a motor/gear unit 802, power screw 814, nut 820, rod 812, clutch 818, a feedback potentiometer 806, & wiper 808 for providing a feedback electrical signal back to the control system. For example, this actuator can be used as the actuator 604 of FIGS. 6, 7 & 8 for controlling or modulating an air valve. Another embodiment of an actuator that can be used is an actuator that does not include an integral feedback sensor, but instead the feedback sensor is mounted on the valve separately. Another embodiment may not include a feedback sensor at all. In this case, that actuator could be controlled in an open-loop fashion. Other types of actuators can also be used such as electrical solenoids or pneumatic or hydraulic cylinders. Rotary actuators and/or sensors could be used in place of the linear units shown in the example. It is to be appreciated that according to various aspects of the invention, the valve position could be controlled proportionally or with as few as two discrete positions (open and closed). It should also be appreciated that one skilled in the art could use any type of actuator or valve control device so as to control a position of the valve, such as, for example, manual activation of the valve by a switch or a manually adjusted control knob, or a processor that receives feedback signals from the prime mover and/or other sensors so as to automatically control the valve. It should also be appreciated that such actuators or valve control devices can be provided with or without any number of different types of sensors to accomplish the same or similar functionality.

Figure 9:
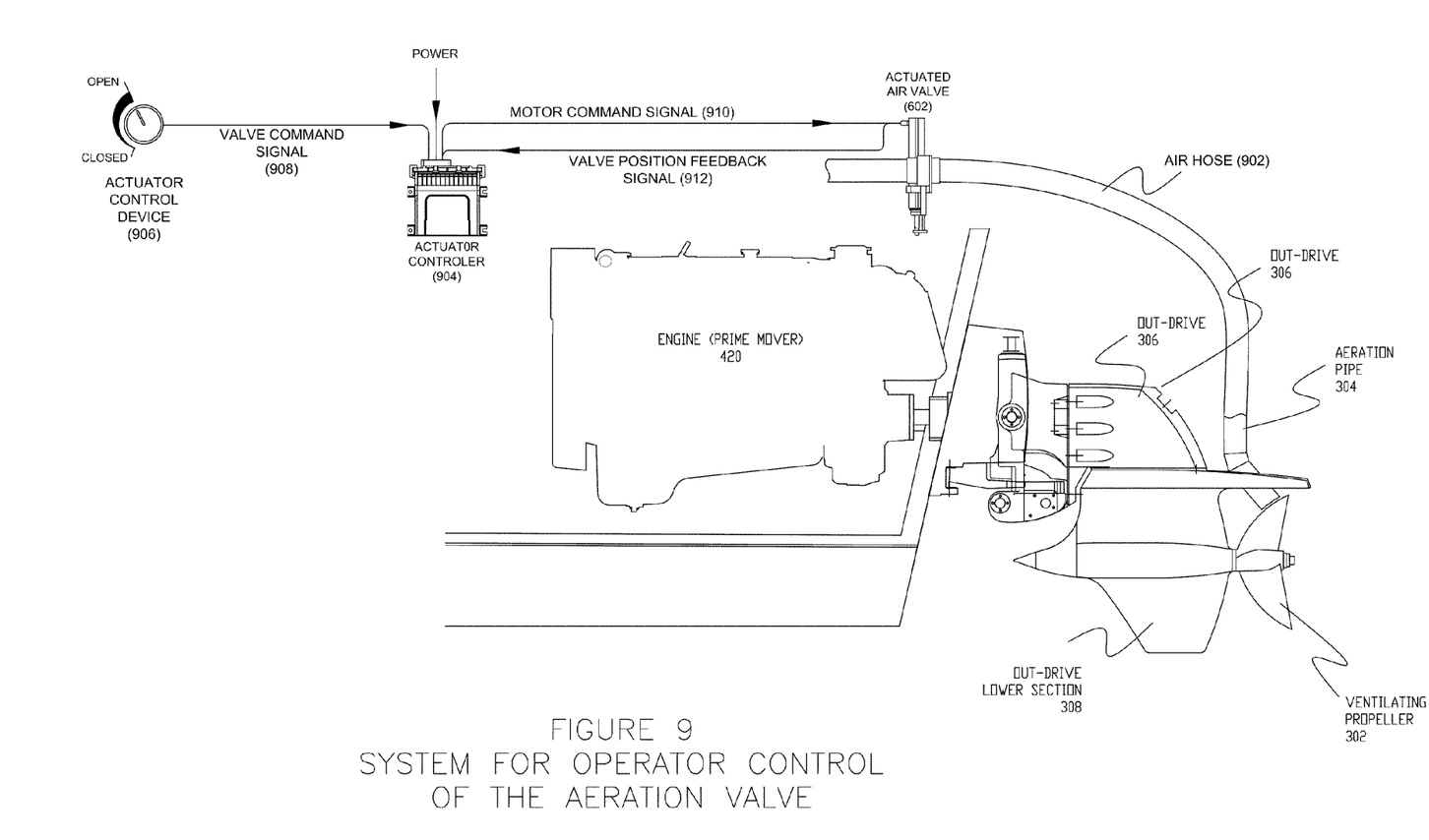
FIG. 9 illustrates one embodiment of a controller and system according to this disclosure.

The valve/actuator assembly 602 in combination with a controller such as, for example, the controller 904 illustrated in FIG. 9, will allow the operator/driver to manually actuate the valve directly while driving the craft. It is to be appreciated that according to aspects of the invention that the valve/actuator can alternatively or in addition be coupled to a processor 402 that receives various prime mover signals such as boost signal 408, RPM signal 410, and torque signal 412, and that automatically actuates the valve to regulate the air provided to the surface ventilating propeller 102, in response to the signals from the prime mover and thus in response to the conditions that the prime mover is operating under. It should be appreciated that one advantage of using various embodiments of the system described herein is that when the craft is running slowly or stopped and the propeller is mostly or completely submerged, the operator and/or the processor can keep the valve in the open position, thereby providing the maximum ventilation to the propeller. In addition, when the engine RPM is increased in order to accelerate the craft forward, the open valve will allow the propeller to spin more freely because it is ventilated and the engine will be allowed (less load on the engine) to accelerate quickly and if the engine is equipped with a turbo-charger, the turbo boost will build up more rapidly than if the valve was closed (so that no air is being provided to the propeller). After the turbo-charger is allowed to sufficiently spin-up, the operator and/or the processor can close the valve and allow the propeller to build up torque and thrust (also referred to as loading-up or biting) and accelerate the craft more quickly than if the valve was left open or if there were no aeration pipe at all.

FIG. 9 illustrates an example of a system that will allow the operator, driver or any person located remotely from the valve to control the valve with the actuator control 906. One advantage of such a system is the operator can control the valve to open and close the valve while the craft is under way. The control device 906 could be mounted in any location (such as on the steering wheel or throttle levers) such that the operator can actuate the valve without have to remove his/her hands from critical controls. The actuated air-valve, such as the valve 602 of FIGS. 6A-B, in this example is connected to the aeration pipe 304 with a flexible hose 902, which has sufficiently flexibility, to allow (or not prevent) the drive unit 306 to move in either of a side to side and/or up and down movement so as to steer the vessel with the valve 602 being fixed. In an alternative configuration, the valve could also be rigidly mounted to the aeration pipe 304. The example system of FIG. 9 uses a separately mounted actuator controller 904 to control the actuator 604 of the actuator/valve assembly 602, in response to a command signal from the actuator control device 906. It is to be understood that the actuator control device can be any number of control devices that include, by way of example, a variable knob such as illustrated in FIG. 9, a switch, a button, a processor, to automatically control the actuator/valve assembly 602 as well as any combination of these control devices. It is also to be understood that the actuator/valve assembly 602 can be controlled by any of these device or any combination of these control devices, so to be moved into any of a plurality of positions such as, for example, by the variable control knob 906 that provides a proportional signal coupled to the actuator/valve assembly 602 to move the blade 510 of actuator/valve assembly 602 proportionally in response to the control signal, or to move the blade 510 of actuator/valve assembly 602 into discrete positions, or combinations of fixed and variable position by combinations of control devices. It is also to be understood that the actuator controller, such as controller 906, can be combined with the actuator/valve assembly 602 into one assembly or can be similarly located with the /valve assembly 602. It is further to be understood that, based on this disclosure, one skilled in the art can arrange or combine any number of basic functional components to obtain the same functionality that is disclosed herein, that for the sake of brevity, the applicant is not going to describe each and every such variant, and that such variants are contemplated and considered to be within the scope of this disclosure.

Figure 10:
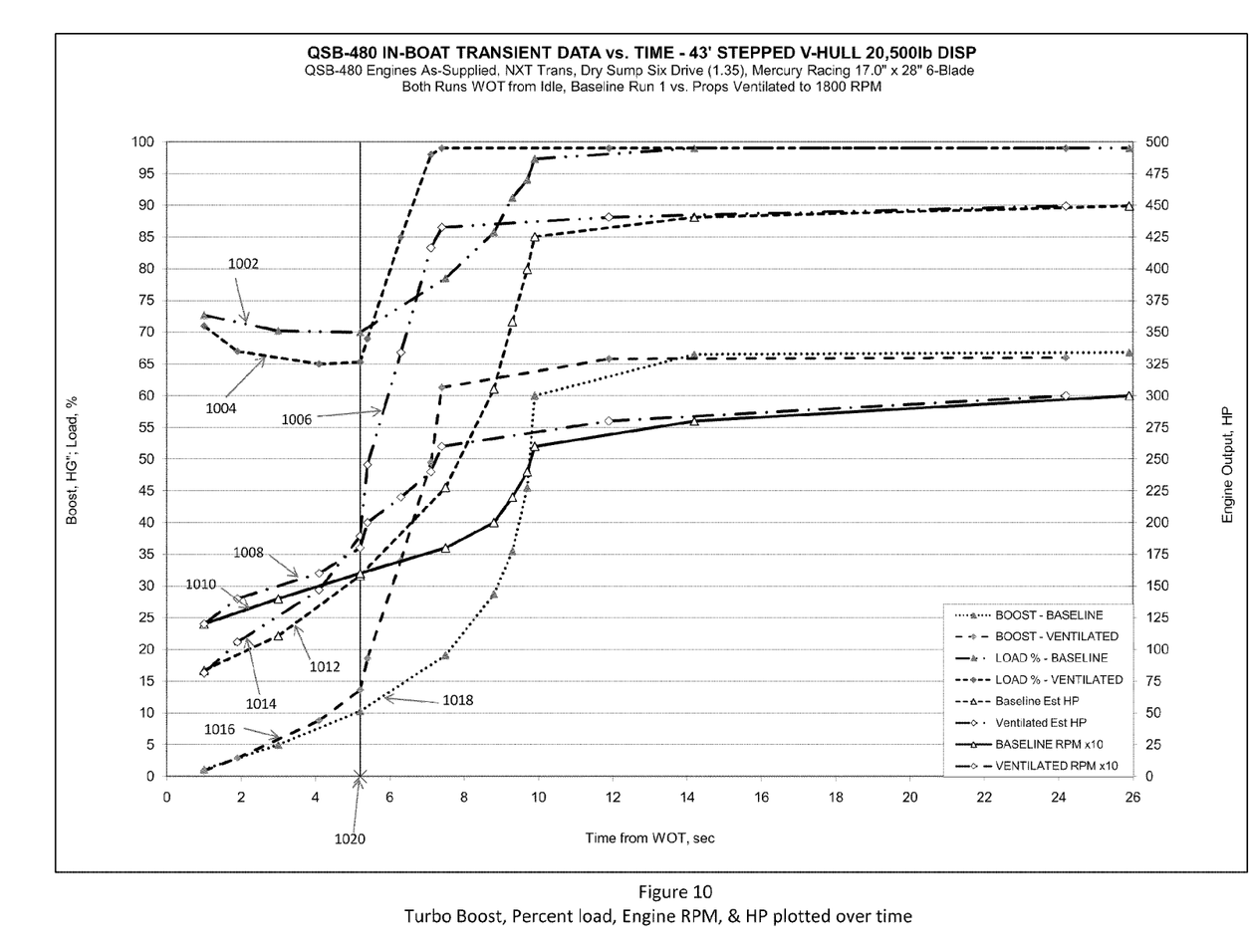
FIG. 10 illustrates some exemplary measurements obtained with the various embodiments of the system disclosed herein.

FIG. 10 illustrates some exemplary measurements obtained with the various embodiments of the system disclosed herein. In particular, FIG. 10 illustrates four basic engine parameters: turbo-boost, percent load (torque), revolutions per minute (RPM) of the propeller drive, and horsepower (HP) plotted as a function of time and as a function of various conditions presented to the prime mover by controlling the amount of aeration to the surface propeller 102 with the actuator controller 906 and the valve/actuator assembly 602. The four parameters are plotted for two conditions: the aeration pipe fully closed or in other words no aeration pipe, which will be referred to as a baseline, and with aeration pipe equipped with an aeration valve and controlled to provide a number of conditions of air flow through the aeration pipe.

By way of example of the improved performance that the system of present invention provides, one can compare the ventilated HP curve 1006 versus the baseline HP curve 1012, which illustrates that full power of the prime mover was achieved approximately three seconds earlier when using the ventilation valve. This set of exemplary curves also illustrates several other aspects of how the control of the ventilation valve changes the dynamics of the system. For example, they are:

1. The point in time (approximately 5.2 seconds) 1020 where the valve was closed is clearly visible by the distinct changes in slope in the ventilated turbo-boost curve 1016, ventilated % load curve 1004, ventilated HP curve 1006 and ventilated RPM curve 1014.

2. The ventilated boost curve 1016 shows how the initial ventilation of the propeller with this system allows the turbo-boost pressure to develop faster than the boost baseline curve 1018 up until the 5.2 second point 1020.
3. The ventilated percent load curve 1004 shows how the load is kept lower than the baseline load percent curve 1002 while the ventilation valve is open (because the propeller is ventilated), thereby allowing the turbo-boost pressure to develop more quickly. When the valve 502 was closed at the 5.2 sec point 1020, the propeller loads up as shown by curve 1004 (due to no ventilation) and the engine load increased sharply. This in-turn forced the boost pressure 1016 to rise sharply. As illustrate by the baseline curve boost curve 1018, if the turbo was not already spinning (due to the ventilation), the turbo-boost would not be allowed to rise sharply as illustrated by curve 1016, and instead would take longer as illustrated by the baseline boost curve 1018,
4. The ventilated RPM curve 1008 compared with the baseline RPM curve 1010 shows how the initial ventilation allows the propeller to spin up faster (higher RPMs) due to no load.

As illustrated by the curves of FIG. 10, temporarily ventilating the propeller (in the initial 5.2 seconds in this case), enables the RPM, HP and turbo-boost to build up faster than not ventilating the propeller. However, it is also appreciated by inventor and provided for by the various embodiments of the system of this disclosure that if the valve 502 was left open all of the time, the boat would have difficulty accelerating, as the boat would never bite into the water (load-up) due to the excessive ventilation. To avoid this situation, the various embodiments of the valve and system of this disclosure provide for the valve 502 to be able either manually or automatically or a combination thereof, close once the turbo charger starts spinning (indirectly indicated by the ventilated turbo-boost line curve 1016), thus allowing the propeller to load up (bite) and develop thrust.

Figures 11A, 11B:
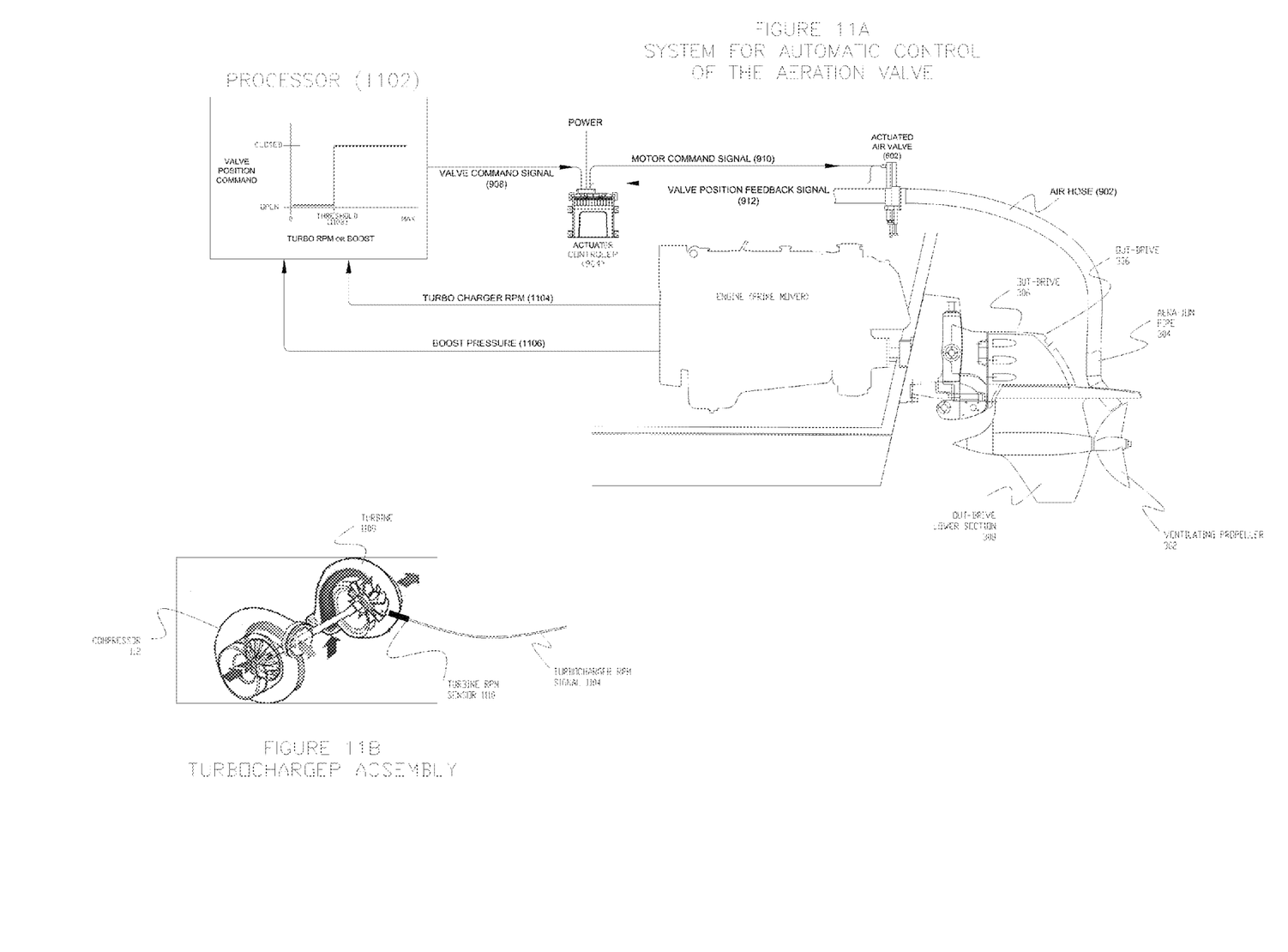
FIG. 11A illustrates another embodiment of a controller and system according to this disclosure.
FIG. 11B illustrates a typical turbocharger assembly that can be mounted to an engine and used with the various embodiments of the system disclosed herein.

FIG. 11A illustrates an another embodiment of a controller and system that can be automated by using a processor 1102 to read one of or a combination of turbocharger RPM signal 1104 and boost pressure signal 1106, and control the position of the valve in order to maximize craft acceleration and available thrust. As illustrated in the figure, the turbo-charger RPM signal 1104, and/or the turbo-boost signal 1106 is sensed from the engine (either by using the on-board engine sensors or with dedicated sensors) and fed into the processor 1102. The processor 1102 configured with a process that outputs a valve command signal 908 in response to the turbo charger RPM signal 1104 or the boost pressure signal 1106. When the turbo RPM signal 1104 or the turbo boost signal 1106 (depending on which signal is being used) is lower than the programmed threshold, the processor 1102 outputs a valve command signal 908 that corresponds to the open position. When the turbo RPM signal 1104 or the turbo boost signal 1106 (depending on which signal is being used) is equal to or higher than the programmed threshold, the processor 1102 outputs a valve command signal 908 that corresponds to the closed position. It is to be appreciated that the processor 1102 can be configured so as to change or adjust the threshold where the valve is opened or closed based on changing operating conditions. For example, the threshold for opening the valve 602 when the throttles are being lowered (usually corresponding to craft deceleration) could be lower as compared to the threshold for closing the valve 602 when the craft is accelerating (as shown with the time plot in FIG. 10).

According to one embodiment, the processor is configured according to the relationship 1102 shown in FIG. 11A, which has two discrete positions for the valve. However, it is to be understood that other configurations of the processor are possible. For example, although not illustrated herein, it is understood that the processor can be configured to provide a number of discrete positions of the valve 602 and/or a proportional relationship of valve positions in response to the sensed signals, in order to automatically control or modulate the air valve 602 in response to the sensed real-time turbo-charger RPM signal 1104 and/or boost signal 1106 information, so as to actively ventilate the propeller 302 to build-up available power (and ultimately thrust) more quickly. It is also to be appreciated that the processor 1102 in FIG. 11A can be replaced with any device that will output a desired valve command in response to real-time engine data in order to unload (by ventilation) the propeller.

While the turbo boost pressure signal 1106 is a useful indicator of the turbo-charger output, it can take time to measure the turbo pressure boost signal, and the delay in time to measure this parameter makes it less than ideal as an indicator for controlling the aeration valve 602. As a result, according to one embodiment of system, the turbo charger RPM signal 1104 is instead sensed by a sensor and provided as the input signal to the processor 1102 (or equivalent device) configured according to disclosed herein. FIG. 11B illustrates a typical turbocharger assembly that can be mounted to an engine and used with the various embodiments of the system disclosed herein. As illustrated in the figure, a sensor 1110 can be mounted directly on or in the turbo charger 1108 so as to read the turbocharger RPM directly and output the turbocharger RPM signal 1104. It should be appreciated that if an engine is equipped with its own turbocharger RPM or boost pressure sensors, it is also possible to connect the processor directly to the engine's data bus and obtain the equivalent signals 1104 and 1106 from the data bus.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An aeration control system for a marine vessel, the aeration control system being coupled to an engine having a turbocharger and coupled to an aeration conduit, the aeration control system comprising:
    an airflow modulation device coupled to the aeration conduit; and
    a control device operative to control, based at least in part on at least one signal sensed from the turbocharger, the airflow modulation device to modulate an amount of aerating gas provided to the aeration conduit to aerate a propeller of the marine vessel.

2. The aeration control system as claimed in claim 1, wherein the at least one signal comprises a turbocharger revolutions per minute (RPM) signal.

3. The aeration control system as claimed in claim 2, further comprising a sensor configured to sense the turbocharger revolutions per minute (RPM) signal from the turbocharger.

4. The aeration control system of claim 3, wherein the sensor is affixed to the turbocharger.

5. The aeration control system as claimed in claim 1, wherein the at least one signal comprises a turbocharger boost pressure signal.

6. The aeration control system as claimed in claim 5, further comprising a sensor configured to sense the turbocharger boost pressure signal from the turbocharger.

7. The aeration control system of claim 6, wherein the sensor is affixed to the turbocharger.

8. The aeration control system as claimed in claim 1, wherein the control device is configured to provide a control signal to the airflow modulation device, in response to receiving the at least one signal sensed from the turbocharger, wherein the airflow modulation device is configured to modulate an amount of aerating gas provided to the aeration conduit in response to the control signal.

9. The aeration control system as claimed in claim 8, wherein the control device is configured to:
provide the control signal having a first value to the airflow modulation device, so as to at least partially open the airflow modulation device to provide aerating gas to the aeration conduit, in response to the at least one signal sensed from the turbocharger being below a first threshold value, and
provide the control signal having a second value to the airflow modulation device, so as to at least partially close the airflow modulation device and restrict flow of aerating gas to the aeration conduit, in response to the at least one signal sensed from the turbocharger being above a second threshold value.

10. The aeration control system as claimed in claim 1, wherein the airflow modulation device is coupled to the aeration conduit by a hose.

11. The aeration control system as claimed in claim 1, wherein the airflow modulation device is affixed to the aeration conduit.

12. The aeration control system as claimed in claim 1, wherein the airflow modulation device comprises a gate valve.

13. The aeration control system as claimed in claim 1, wherein the propeller is constructed as a fixed propeller such that an axis of the fixed propeller does not move in position with respect to a transom of the marine vessel.

14. The aeration control system as claimed in claim 1, wherein the propeller is constructed as an articulated propeller in combination with an actuator that changes a position of the articulated propeller in response to an actuation control signal to one of a plurality of positions to vary an amount of submergence of the propeller.

15. A method of controlling aeration of a propeller of a marine vessel, the marine vessel comprising an engine and an aeration conduit, the engine having a turbocharger, the method comprising:
modulating, using an airflow modulation device, an amount of aerating gas provided to the aeration conduit to aerate the propeller based, at least in part, on at least one signal sensed from the turbocharger.

16. The method of claim 15, wherein the at least one signal comprises a turbocharger revolutions per minute (RPM) signal.

17. The method of claim 16, wherein the turbocharger RPM signal is obtained by a sensor configured to sense turbocharger RPM, wherein the sensor is affixed to the turbocharger.

18. The method of claim 15, wherein the at least one signal comprises a turbocharger boost pressure signal.

19. The method of claim 18, wherein the turbocharger boost pressure signal is obtained by a sensor configured to sense turbocharger boost pressure, wherein the sensor is affixed to the turbocharger.

20. The method of claim 15, wherein modulating the amount of airflow comprises using a control device to provide, in response to the control device receiving the at least one signal, a control signal to the airflow modulation device.

21. The method of claim 20, wherein using the control device to provide the control signal to the airflow modulation device comprises:
providing the control signal having a first value to the airflow modulation device, so as to at least partially open the airflow modulation device to provide aerating gas to the aeration conduit, in response to the at least one signal sensed from the turbocharger being below a first threshold value, and
providing the control signal having a second value to the airflow modulation device so as to at least partially close the airflow modulation device so as to restrict flow of aerating gas to the aeration conduit in response to the at least one signal sensed from the turbocharger being above a second threshold value.

* * * * *